United States Patent
Grover

(10) Patent No.: US 10,814,920 B2
(45) Date of Patent: Oct. 27, 2020

(54) REAR SPOILER DEVICE WITH FORCE ABSORBING DEVICE TO COMPENSATE A FORCE BETWEEN AT LEAST TWO COMPONENTS

(71) Applicant: COMPAGNIE PLASTIC OMNIUM, Lyons (FR)

(72) Inventor: Pawan Grover, Chandigarh (IN)

(73) Assignee: COMPAGNIE PLASTIC OMNIUM, Lyons (FR)

( * ) Notice: Subject to any disclaimer, the term of this patent is extended or adjusted under 35 U.S.C. 154(b) by 19 days.

(21) Appl. No.: 16/380,193

(22) Filed: Apr. 10, 2019

(65) Prior Publication Data

US 2019/0308676 A1    Oct. 10, 2019

(30) Foreign Application Priority Data

Apr. 10, 2018    (FR) ...................... 18 53121

(51) Int. Cl.
    *B62D 35/00*    (2006.01)
(52) U.S. Cl.
    CPC ................... *B62D 35/007* (2013.01)
(58) Field of Classification Search
    CPC ................................................ B62D 35/007
    USPC ...................................................... 296/180.1
    See application file for complete search history.

(56) References Cited

U.S. PATENT DOCUMENTS

| | | | | |
|---|---|---|---|---|
| 2006/0203504 A1* | 9/2006 | Mori | ............... | B60Q 1/2626 |
| | | | | 362/541 |
| 2010/0026045 A1* | 2/2010 | Thomas | ............... | B62D 35/007 |
| | | | | 296/180.1 |
| 2013/0223091 A1* | 8/2013 | Inubushi | ............... | B62D 35/007 |
| | | | | 362/549 |
| 2015/0084370 A1* | 3/2015 | Newberry | ............... | B62D 35/007 |
| | | | | 296/180.1 |
| 2015/0166130 A1* | 6/2015 | Lee | ............... | B60R 19/38 |
| | | | | 296/180.5 |
| 2016/0221614 A1* | 8/2016 | Demange | ............... | B62D 35/007 |
| 2016/0303954 A1* | 10/2016 | Kawashima | ............... | B60J 5/107 |

(Continued)

FOREIGN PATENT DOCUMENTS

| FR | 2982568 A1 | 5/2013 |
|---|---|---|
| WO | WO 2016/083705 A1 | 6/2016 |
| WO | WO 2017/115029 A1 | 7/2017 |

OTHER PUBLICATIONS

FR 1853121 search report dated Dec. 3, 2018.
FR 1853121 written opinion.

*Primary Examiner* — Jason S Morrow
(74) *Attorney, Agent, or Firm* — Anglehart et al.

(57) ABSTRACT

The exemplary embodiments of the present disclosure relates to a rear spoiler device comprising a force-absorbing device for compensating a force between at least two components (1, 2), in particular of a motor vehicle, a rear spoiler and preferably a hatch, which are respectively corresponding modular components, with at least a first component (1) and at least a second component (2), wherein the force absorbing device comprises at least one deformable tongue member (3) and at least one stud member (4) engaging at least partly in the tongue member (3), the tongue member (3) being deformable relative to the stud member (2) along a deformation path (5) of the tongue member (3) as a function of a force application path (6) acting on the first (1) or second (2) component.

8 Claims, 2 Drawing Sheets

(56) References Cited

U.S. PATENT DOCUMENTS

2017/0282981 A1* 10/2017 Leterrier .................... B60J 1/18
2019/0193533 A1* 6/2019 Chiba ...................... B60J 5/101

* cited by examiner

REAR SPOILER DEVICE WITH FORCE ABSORBING DEVICE TO COMPENSATE A FORCE BETWEEN AT LEAST TWO COMPONENTS

The present application relates to a force-absorbing device intended to compensate a force between at least two components, in particular in a motor vehicle, preferably between a rear spoiler and a hatch.

Currently, body panels, rear spoilers, hatches, sills and other exterior plastic components of vehicles are often assembled from several components and at least from two components. Such components usually consist of plastics which can crack or break under the action of unfavorable forces, for example in the case of significant forces acting via a lever arm effect. In particular, the rear spoilers protruding beyond the general contour of the vehicle, for example a hatch, may be damaged by a force applied thereto. In particular, when vehicles fitted in this manner are washed in roller washing stations, the rotation of the rollers may result in transient forces which can tear or break protruding rear spoilers. In order to obtain good results when cleaning vehicles, the rollers at the washing stations operate at high rotational speeds, so that the level of force exerted is very high. Especially in case of repeated washing, as is the case throughout the life cycle of a vehicle, the action of these forces can regularly lead to breaks or cracks as described herein. In particular, as the force finds a lever by exerting a kind of lever effect on the outer edge of the rear spoiler up to the point of attachment of the rear spoiler on the body, or for example on the hatch, this lever exerts a high level of force on the support structure due to rotational torque. Thus, forces greater than 1000 N, and up to 1200 or even 1500 N, can be exerted on a connected component.

These exemplary embodiments of the present disclosure therefore aims to outline a rear spoiler device comprising a force absorbing device, which avoids the disadvantages of the current industry standards and in particular aims to ensure simple and reliable stability with a simple production process, also ensuring that no damage occurs when forces are applied.

The purpose of these exemplary embodiments of the present disclosure is achieved using a rear spoiler device comprising a force absorbing device having features in accordance with these exemplary embodiments of the present disclosure. Preferred production methods of these exemplary embodiments of the present disclosure are set out in the sub claims section.

The rear spoiler device presented in these exemplary embodiments of the present disclosure, comprising a force absorbing device, or the corresponding modular component, may in particular form an integral part of a vehicle. The rear spoiler device presented in these exemplary embodiments of the present disclosure, comprising a force-absorbing device which acts to compensate a force between at least two components comprises at least a first component and at least a second component. The force absorbing device further comprises at least one deformable tongue member and at least one stud member seated within the tongue member, at least in part. The tongue member is deformable at least in part relative to the stud member. This occurs through relative movement between the deformable tongue member and the stud member. The tongue member is deformable along a deformation path within the tongue member. This occurs as a function of a force application path acting on the first or second component.

In accordance with these exemplary embodiments of the present disclosure, the force acting on the first or second component via the force application path is converted into a relative movement of the stud member located on the first or second component via engagement with the tongue member along a deformation path of the tongue member, in which the force which is applied by the force application path is correspondingly compensated by the deformation, so that breaking or tearing of the first and/or second tongue member component can be avoided in accordance with these exemplary embodiments of the present disclosure. Thus, forces up to approximately 3000 N can be absorbed and compensated in accordance with these exemplary embodiments of the present disclosure.

For simple fastening of the first component and the second component relative to each other during installation, these exemplary embodiments of the present disclosure allows the first component and the second component to be connected to each other using at least one fastening method. Thus, a simple installation of a corresponding rear spoiler on a hatch is presented in a technically simple manner.

Accordingly, with the use of such an at least one fastening member, the force application path and the deformation path may be spaced differently with respect to the fastening member. That is, the force application path forms a power arm relative to the different attachment member of the power arm which acts along the deformation path within the tongue member. Thus, a suitably acting torque through the force application path acting on the fastening member, up to the deformation path of the tongue member with respect thereto, can be increased or decreased as a result, in a technically simple way. Thus, adjustment of the stud member according to the expected maximum force, that is to say as a function of the maximum expected torque at the fastening member, can be calculated in a structurally simple manner and the deformable tongue member which absorbs the force may be suitably assembled or designed to absorb forces depending on its thickness, length or the material used, for example, without requiring the use of too much or too little material in any location.

The tongue member may be deformed along its deformation path in a number of parts. For example, an elastic deformation path is initially presented along the deformation path, with elastic deformation of the tongue member and/or a plastic deformation path that follows with plastic deformation of the corresponding tongue member. In addition, in accordance with these exemplary embodiments of the present disclosure, a plastic deformation member may be further integrated into the tongue member. The production method of the force absorbing device thus designed in accordance with these exemplary embodiments of the present disclosure provides a particularly high absorption of force. Where required, in the case of a deformed tongue member or in the case of a deformation member deformed within the tongue member, the ease of use of a correspondingly designed force absorbing device may be clearly demonstrated in that this member may simply be replaced in accordance with these exemplary embodiments of the present disclosure.

In accordance with these exemplary embodiments of the present disclosure, along the deformation path and before the beginning of the deformation path of the tongue member itself in accordance with these exemplary embodiments of the present disclosure, free travel may occur without deformation of the tongue member under the action of a corresponding force along the direction of the force application path. In other words, the two members comprising these exemplary embodiments of the present disclosure, the deformable tongue member and the stud member are not yet engaged with each other but are only brought into engagement with each other upon such free travel. This may for example be advantageous when the force absorbing device in accordance with these exemplary embodiments of the present disclosure cannot be precisely installed in its mounting position, for example when spacing dimensions in the area of the vehicle body necessitate adaptation and changes in orientation of certain components relative to each other. In such cases it remains possible to obtain reliable force absorption between two components via the existing free travel.

In order to allow the greatest possible flexibility of the rear spoiler device in accordance with these exemplary embodiments of the present disclosure comprising the force absorbing device, the tongue member can be located on the first component and the stud member can be located on the second component. But it is also possible to locate the stud member on the first component and, conversely, to locate the tongue member on the second component. The particular location of the optionally exchangeable tongue member which absorbs the force is particularly flexible and can be specifically selected depending on the configuration of the component. The term "localized" or "localization" must be understood, in the context of the exemplary embodiments of the present disclosure described, in the sense of application and/or fastening, for example by integration within a component, by gluing, by screwing and/or by riveting or such methods, with the spatial installation completed before or during assembly of the device in accordance with these exemplary embodiments of the present disclosure. In particular, a rear spoiler device comprising a force absorbing device in accordance with these exemplary embodiments of the present disclosure may be produced, in the form of a pre-assembled modular component, for example for subsequent mounting on a vehicle.

As already mentioned, the device in accordance with these exemplary embodiments of the present disclosure may be implemented in the case where the first component is a rear spoiler and the second component is, in particular, a hatch.

The exemplary embodiments of the present disclosure therefore relates to a modular component generally intended for mounting in a vehicle, which comprises, as a rear spoiler device, the force absorbing device in accordance with the corresponding exemplary embodiments of the present disclosure described above and with the characteristics described. Such a modular component may also be pre-assembled for subsequent installation on a vehicle, where preferred. These exemplary embodiments of the present disclosure will be explained in more detail below and is not limited to the production methods which are shown only by way of non-exhaustive example and with reference to the appended figures in which:

Figure 1:
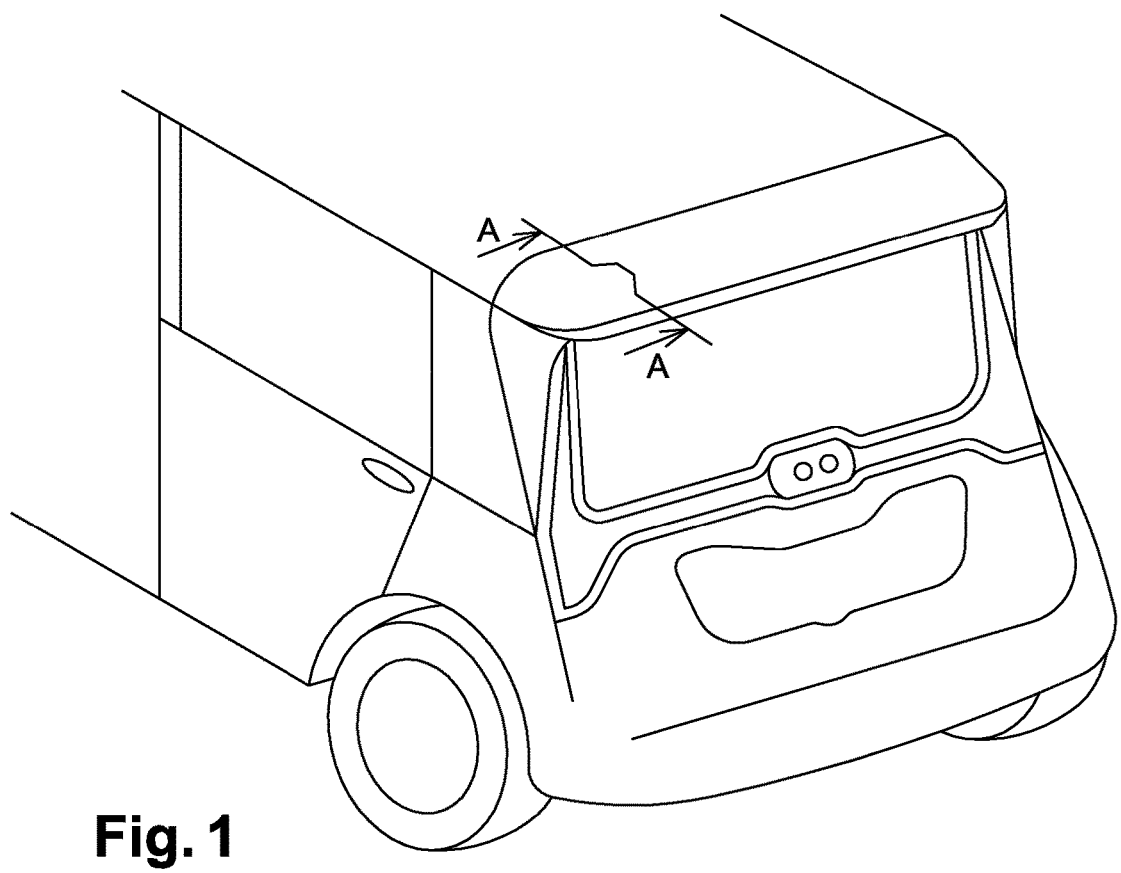
FIG. 1 is a schematic view of a motor vehicle in which a rear spoiler device comprising a force absorbing device in accordance with these exemplary embodiments of the present disclosure may be used.
Figure 2:
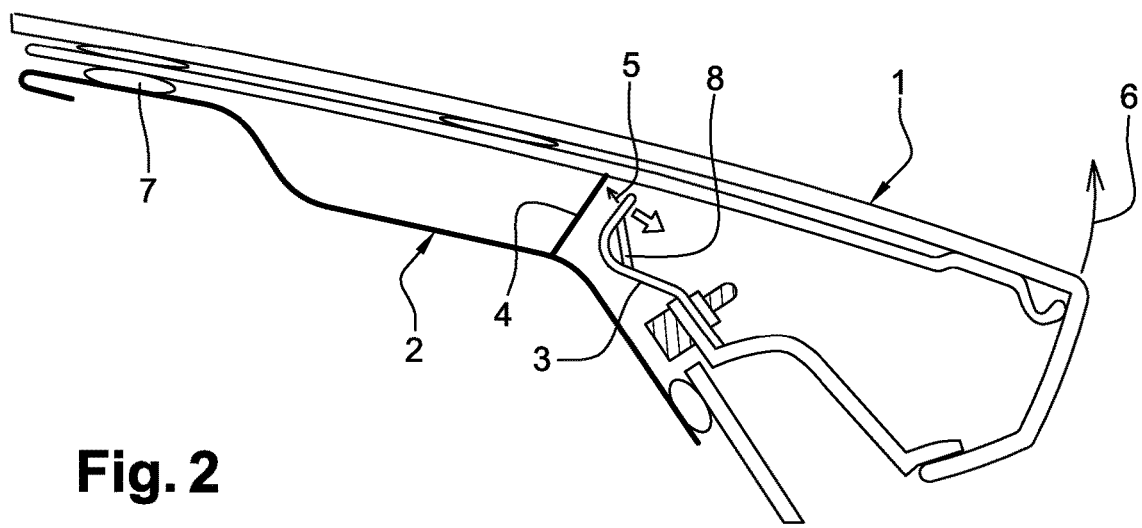
FIG. 2 is a schematic sectional view along the line A-A of FIG. 1 of a rear spoiler device comprising a force absorbing device according to one possible production method of these exemplary embodiments of the present disclosure.
Figure 3:
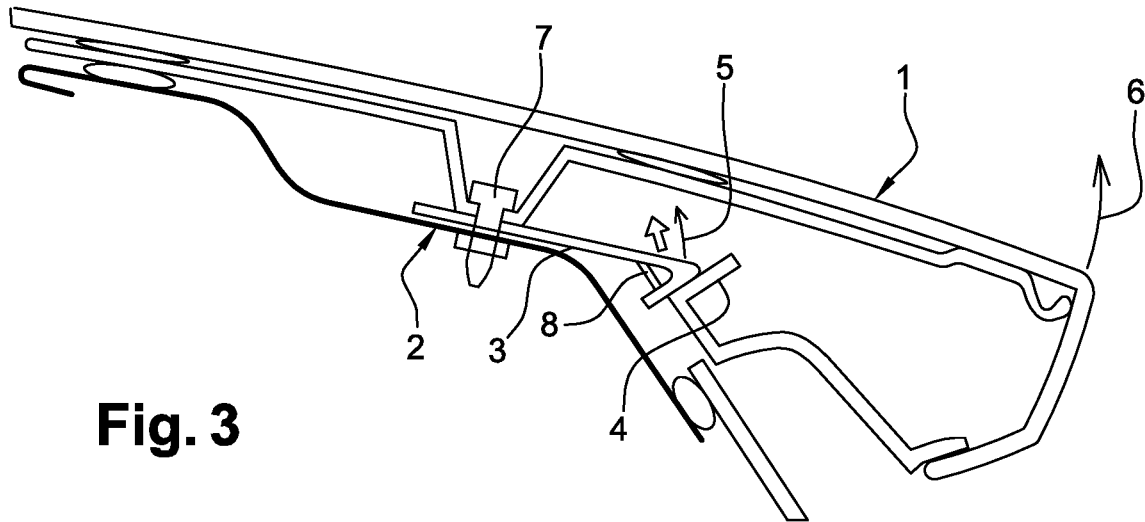
Figure 4:
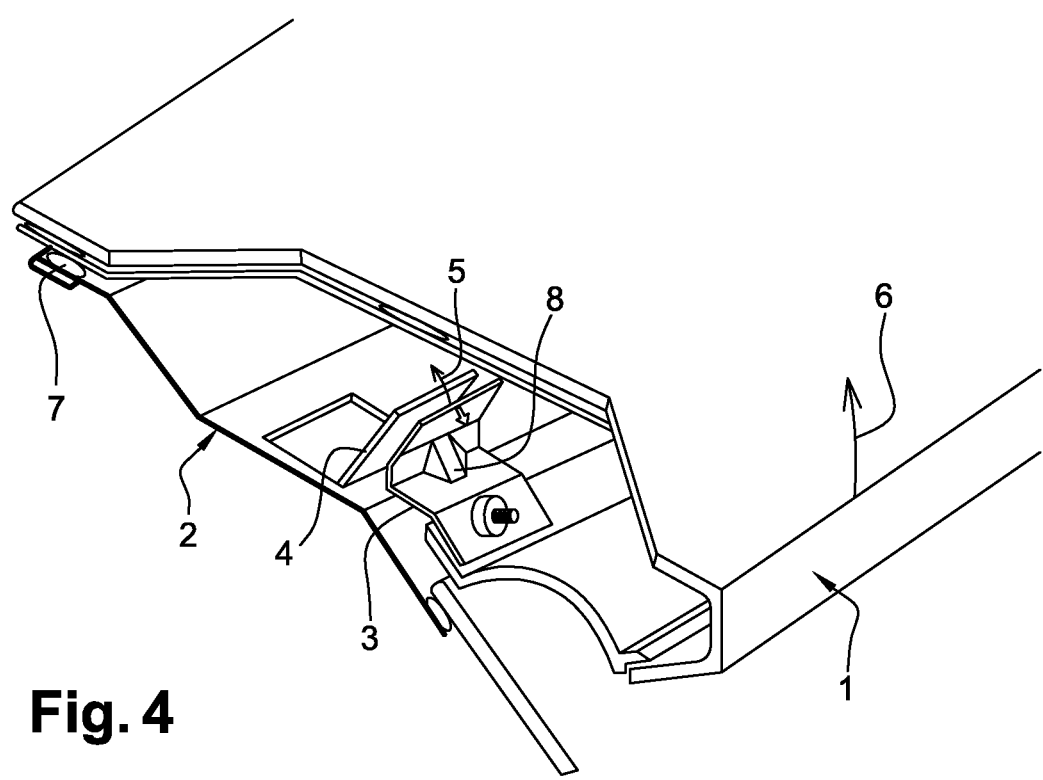

FIG. 3 is a schematic sectional view along the line A-A of FIG. 1 of a rear spoiler device comprising a force absorbing device according to a second possible production method; and FIG. 4 is a schematic sectional and isometric view of a rear spoiler device comprising a force absorbing device substantially in accordance with the first possible production method of these exemplary embodiments of the present disclosure of FIG. 2.

In these figures, identical members are designated by identical references.

FIG. 1 is a schematic view of a motor vehicle, wherein a rear spoiler device comprising a force absorbing device in accordance with these exemplary embodiments of the present disclosure may be used. FIG. 1 is specifically a rear view of such a motor vehicle with a first component 1, namely a rear spoiler, which is fixed on a second component 2, namely a hatch. Between the first component 1, the rear spoiler and the second component 2, the hatch, the force absorbing device in accordance with these exemplary embodiments of the present disclosure as described below can therefore be used, the rear spoiler as the first component 1 and the hatch as a second component 2 forming a corresponding modular component.

FIG. 2 is a schematic sectional view along the line A-A of FIG. 1 of a rear spoiler device comprising a force absorbing device according to one possible production method of these exemplary embodiments of the present disclosure. The rear spoiler as the first component 1 is firmly connected to the second component 2 designed as a hatch piece through at least one fastening method 7, in this case for example, gluing. In accordance with these exemplary embodiments of the present disclosure, according to the first production method shown in FIG. 2 of the force absorbing device in accordance with these exemplary embodiments of the present disclosure, a tongue member 3 is attached to the rear spoiler as the first component 1 by means of screwing, and a stud member 4 protruding from the bodywork panel of the hatch is coupled to the corresponding second component 2.

If a suitable force is now exerted along force application path 6 on the first component 1 (upwards in FIG. 2 and FIGS. 3 and 4), the corresponding component 1 deforms and, firstly, the tongue member 3 moves without deformation towards the stud member 4 and then along a deformation path 5 within the tongue member 3. Where further movement occurs, the tongue member 3, in engagement with the stud member 4, then deforms in relation to this member along deformation path 5 as a function of the additional movement along the force application path 6. This is indicated in FIG. 2 by the solid arrow. If the movement along deformation path 5 were to be further deformed by means of an elastic deformation, which is reversible, a plastic deformation of the plastic deformation member 8 of the tongue member 3, which would not be reversible, would then occur according to the travel of any additional plastic deformation.

In accordance with these exemplary embodiments of the present disclosure, a force acting upon the area of the rear spoiler, which force may be considered as a torque applied to the fastening member 7, may be correspondingly compensated by an elastic deformation and possibly also by a plastic deformation of the tongue member 3. Thus, tearing or breakage of the first component 1, i.e. the rear spoiler, can be reliably prevented, even in the case of transient forces up to 3,000 newtons acting on the edge of the spoiler.

FIG. 3 is a schematic sectional view of a rear spoiler device comprising a force absorbing device according to a second production method of these exemplary embodiments of the present disclosure, showing an alternative manner in which it may be installed along the A-A section in the motor vehicle according to FIG. 1.

The production method of the rear spoiler device in accordance with these exemplary embodiments of the present disclosure comprising a force absorbing device as in FIG. 3 differs from the production method shown in FIG. 2 in that the fastening member 7 is here a screwed assembly consisting of the first component 1, the rear spoiler, and the second component 2, the hatch. In the representation of the production method according to FIG. 3, the tongue member 3 is screwed with the fastening member 7 and the stud member 4 is fixed and projects over the first component 1, the rear spoiler. This rear spoiler device is therefore designed as a pre-assembled modular component. Furthermore, according to the production method of FIG. 3, between the tongue member 3 and the stud member 4, no free travel without deformation of the tongue member 3 is intended before the actual deformation path 5. In the assembled position, the tongue member 3 and the stud member 4 engaged therein are already in contact with each other. The action of the force or movement is presented in FIG. 3 and in FIG. 2, by the arrows representing the force application path 6 and the deformation path 5. The deformation of the tongue member 3 is again represented by a solid arrow.

FIG. 4 is a schematic sectional and perspective view of a rear spoiler device including a force absorbing device substantially similar to the first production method of these exemplary embodiments of the present disclosure in FIG. 2. The construction of stud member 4 appears clearly in the form of a folding of a portion of the sheet material of the second component 2, the hatch. Furthermore, the screwing of the tongue member 3 with the plastic deformation member 8, onto the first component 1, the spoiler, is particularly visible in the illustration of FIG. 4.

The figures do not explicitly represent a production method of these exemplary embodiments of the present disclosure, in which the tongue member is located on the second component, for example the hatch.

It is to be noted generally that the arrows shown in the figures representing the force application path and the deformation path 5, and the solid arrow which represents the actual deformation of the tongue member 3, are not at all to scale and are only intended to schematically illustrate the design in accordance with these exemplary embodiments of the present disclosure.

The above production methods have been described to illustrate possible production methods and it is clear to those skilled in the industry that distinct variations of the forms described herein may be used, with the implementation of the claims, without deviating from the scope of these exemplary embodiments of the present disclosure. It is expected and even intended that developments in the technique presented here may occur, especially since the range of devices and components presented are given by way of example and is not exhaustive, in such a way that the scope of these exemplary embodiments of the present disclosure is limited solely by the purpose of the appended claims.

The invention claimed is:

1. A rear spoiler device comprising a force-absorbing device for compensating a force between at least two components, with at least a first component and at least one second component, wherein the force absorbing device comprises at least one deformable tongue member and at least one stud member seated, at least partly, in the tongue member, the tongue member being deformable with respect to the stud member along a deformation path within the tongue member as a function of a force application path acting on the first or second component.

2. Device according to claim 1, wherein the first component and the second component are connected to each other through at least one fastening member.

3. Device according to claim 2, wherein the force application path and the deformation path are spaced differently to the fastening member.

4. Device according to claim 1, wherein the tongue member has, along its deformation path, an elastic deformation path including an elastic deformation of the tongue member and/or a plastic deformation path with plastic deformation of the tongue member, and/or free travel without deformation of the tongue member before the beginning of the deformation path.

5. Device according to claim 4, wherein the tongue member comprises a plastic deformation member.

6. Device according to claim 1, wherein the tongue member is located on the first component, and in that the stud member is located on the second component.

7. Device according to claim 1, wherein the stud member is located on the first component, and in that the tongue member is located on the second component.

8. Device according to claim 1, wherein the first component is a rear spoiler, and in that the second component is a hatch.

* * * * *

UNITED STATES PATENT AND TRADEMARK OFFICE
CERTIFICATE OF CORRECTION

PATENT NO. : 10,814,920 B2  
APPLICATION NO. : 16/380193  
DATED : October 27, 2020  
INVENTOR(S) : Pawan Grover Page 1 of 1

It is certified that error appears in the above-identified patent and that said Letters Patent is hereby corrected as shown below:

On the Title Page

Item [71], delete "Lyons" and insert --Lyon--.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*